Aug. 4, 1925.
J. A. DODGE
1,548,415
DIFFERENTIAL AND STATIC PRESSURE GAUGE
Filed June 12, 1922
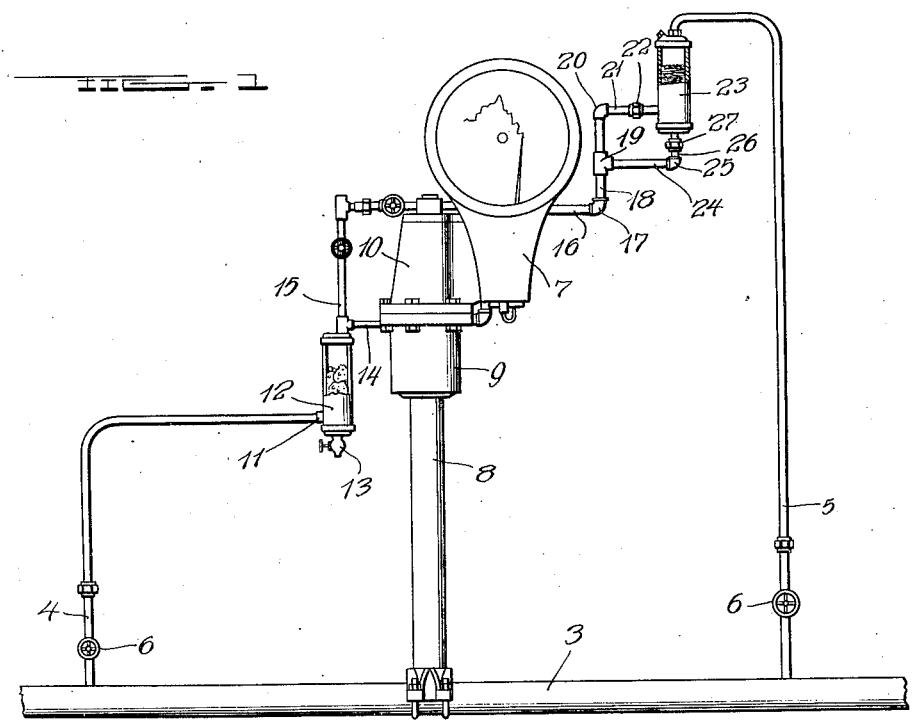
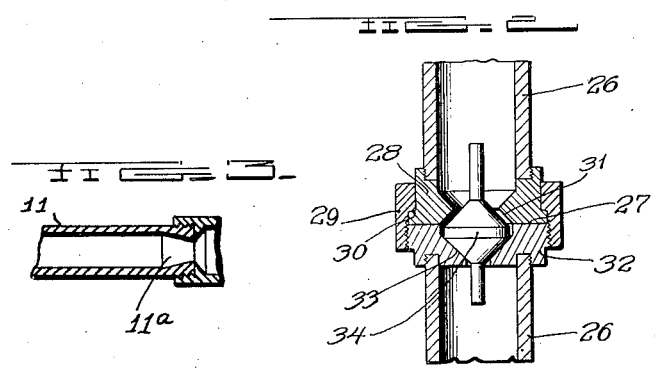
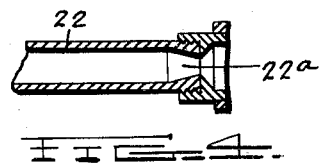
Inventor
John A. Dodge
By Gordon Stewart
Attorneys Patented Aug. 4, 1925.

1,548,415

UNITED STATES PATENT OFFICE.

JOHN A. DODGE, OF BAKERSFIELD, CALIFORNIA.

DIFFERENTIAL AND STATIC PRESSURE GAUGE.

Application filed June 12, 1922. Serial No. 567,800.

*To all whom it may concern:*

Be it known that I, JOHN A. DODGE, a citizen of the United States, residing in Bakersfield, in the county of Kern and State of California, have invented certain new and useful Improvements in Differential and Static Pressure Gauges, for which the following is a full and complete specification, reference being had to the accompanying drawings.

My invention relates to recording pressure gauges for air, natural gas and the like, and has particular reference to the provision in said gauges of attachments serving to purify that portion of the gas stream which comes into contact or passes through the mechanism of said gauges.

Gauges which are used to measure the flow of such gases in a pipe must be protected against the detrimental effect of the impurities in the fluid to be measured. For example, oil, sand, water, scale, etc., if present in the gas stream and admitted to working parts of the gauge will foul the mercury rendering it sluggish and, furthermore, these impurities collecting in the gauge seriously interfere with the accuracy of the readings. Such gas streams as it is intended to measure are frequently subject to abnormal surges of pressure of such amplitude as to cause an abnormal and inaccurate movement of the recording index. It is also a frequent occurrence for such a surge in the gas stream to displace some of the mercury from the container of the gauge and carry this mercury off. This condition requires frequent inspection of the gauge and the replacement of the lost mercury.

It is a purpose of my invention to provide means for purifying the gas to be measured prior to its contact with the mercury in the gauge. Novel means have also been devised for checking any abnormal surge of gas of great volume and to prevent its detrimental effect upon the reading of the gauge. This also prevents a loss of mercury except under very unusual circumstances. Such mercury as may be displaced from its receptacle will, by my invention be promptly and effectually returned to the receptacle without attention on the part of the operator.

With these and other objects and advantages which flow from my invention, and will be apparent from the following description, I have illustated one form in which my invention may be embodied in the accompanying drawings, it being evident that this is but one of the numerous ways in which my invention may be constructed.

In the accompanying drawings,

Fig. 1 is a vertical elevation showing a pressure gauge embodying one form of my invention, Fig. 2 is a vertical section of the valve by-pass shown in Fig. 1, and Figs. 3 and 4 are details of the means for minimizing abrupt fluctuations in pressure.

The main or pipe line, the gas flow of which it is desired to measure, is indicated diagrammatically at 3. The main 3 is tapped to draw off a portion of the gas stream for measuring purposes through the pipe 4.

After passing to or through the gauge and its associated parts, the contents of pipe 4 are returned to the main 3 through pipe 5. The customary forms of valves are provided at 6 in pipes 4 and 5.

A recording meter or mercury gauge has been indicated diagrammatically in Fig. 1 by the numeral 7. This gauge is mounted upon the standard 8 in the customary manner. A casing 9 encloses the usual apparatus for measuring the pressure of the gas from the pipe 4. Above the casing 9 is another casing 10 through which the gas from pipe 4 may pass in its travel to the return pipe 5. The pipe 4 terminates in a restricted nipple 11, the purpose of which is to cut down the volume of the gas which may come in contact with the gauge. The restricted nipple 11 is connected to the lower side of the trap 12 which may contain absorbent material such as sponges or the like. A drain cock 13 leads from the base of trap 12. From the top of trap 12 a pipe 14 leads the gas into the gauge while a valve by-pass 15 is provided around the latter.

The outlet pipe 16 from the gauge has an elbow 17. Upwardly from the elbow 17 runs pipe 18 in which there is a T-connection 19. A pipe runs from T 19 upward and by means of an elbow conducts the gas through pipe 21 and restricted nipple 22, from which latter the gas enters the trap 23.

Leading outwardly from the T 19 is the by-pass pipe 24 which terminates in an elbow 25 beneath the trap 23. The elbow 25 is connected to the base of the trap 23 by means of a pipe 26 in which there is located a valve 27.

An enlarged view of valve 27 is shown in Fig. 2.

A valve member 28 is screw threaded to the upper part of pipe 26. A sleeve 29 is carried on the outer cylindrical surface of the valve member 28 and rests upon a rib thereof 30. The inner surface of the valve member 28 carries the conical valve seat 31.

A member 32 is screw threaded on the lower part of pipe 26, and in turn is screw threaded into the sleeve 29. This forms a union between the upper and lower portions of the pipe 26. The inner face 33 of member 32 serves as a support for a free valve plunger 34 which is movable into engagement with face 31 when the gas stream passes through the gauge. The member 11 is restricted as shown at 11$^a$ in Fig. 3 and a corresponding restriction 22$^a$ is formed in member 22 as shown in Fig. 4.

The stream of gas passing through pipe 4 is checked by passing through the nipple 11 so that sudden changes in the pressure will be minimized. The trap 12 is filled with sponges or other porous material which remove from the gas all foreign matter whether solid or liquid. This débris may be removed from the trap through the drain 13, while it is intended that the material in the trap may be removed for cleaning or replacement at will. The purified gas then passes through pipe 14 into the chamber of the gauge and there causes a record to be made in the customary manner. The excessive gas from the gauge passes through pipe 16 into trap 23 by way of pipe 21. The gas is then returned to main 3 through pipe 5.

In the event that the variation in pressure is great enough to displace some of the mercury from the gauge and to carry the displaced portion into pipe 18, this portion of mercury must pass through pipe 21 as the sudden increase in fluid pressure will bring portion 34 against valve seat 31 and close the passageway 24. The trap 23 contains metal shavings which have been preferably tinned. The mercury is thus caught upon the tinned shavings and after accumulating will drain down into pipe 26. As soon as the pressure is balanced between pipe 24 and trap 23, the plunger 34 will fall and permit the accumulated mercury to pass down pipe 26 and back to the receptacle of the gauge by way of pipes 24 and 16.

The plunger 34 which forms the valve is made of any appropriate material such as wood, rubber, the ordinary metals or the like. Due to the high specific gravity of the mercury as regards any of these materials mentioned, the plunger will be lifted above the accumulation of mercury in the valve chamber. In this way, while the normal position of the valve plunger is against the lower wall 32, abnormal gas pressure from beneath will lift the valve and close the passage against the upward flow of any mercury which may have passed into the lower portion of pipe 26. The flow is therefore restricted to pipe 21 and around the valve 27. In the event that the mercury accumulates in the trap 23 and in the pipe 26 above valve 27, then the buoyant effect of this material upon the plunger 34 causes the latter to rise and release the mercury, permitting the same to flow back to the chamber of the gauge through pipes 24 and 16.

Trap 23 may have an opening through which mercury is delivered to the gauge when the latter is put into operation. This will be evident from the fact that the force of gravity operates to maintain a free passage from the trap 23 down to the gauge 10. From this arrangement it will be evident that it is possible to reset the gauge by adding mercury through the trap 23 and without disturbing the gauge itself.

In the manner above described, my invention provides for the purification of the gases, the pressure of which is being measured, the protection of the gauge from abnormal changes in gas pressure and for the maintenance of the gauge without loss of mercury therefrom.

Numerous changes in structure above described may be made without departing from the scope of my invention as defined in the following claims.

What I claim is:

1. In combination with a conduit, a gauge to measure the pressure of a gaseous stream flowing through the conduit, piping adapted to form a connection from said conduit to the gauge, said piping being shaped for minimizing abrupt variations in the pressure of said gaseous stream, means included in said piping for purifying the gas delivered to the gauge and an outlet from said gauge adapted for connection with said conduit.

2. In combination with a conduit, a gauge to measure the pressure of a gaseous stream flowing through the conduit, piping adapted to form a connection from said conduit to the gauge, said piping being restricted at one point, means included in said piping for purifying the gas delivered to the gauge and an outlet from said gauge adapted for connection with said conduit.

3. In combination with a conduit, a gauge to measure the pressure of a gaseous stream flowing through the conduit, piping adapted to form a connection from said conduit to the gauge, means included in said piping for purifying the gas delivered to the gauge, a return pipe from the gauge adapted for connection with said conduit, said return pipe being restricted at one point.

4. In combination with a conduit, a gauge to measure the pressure of a gaseous stream flowing through the conduit, a pipe adapted to form a connection from said conduit to the gauge, a return pipe from the gauge adapted to form a connection with said conduit, said return pipe being restricted at one point and a liquid trap in said return pipe beyond the restricted point.

5. In combination with a conduit, a gauge to measure the pressure of a gaseous stream flowing through the conduit, piping adapted to form a connection from said conduit to the gauge, said piping being shaped for minimizing abrupt variations in the pressure of said gaseous stream, means included in said piping for purifying the gas delivered to the gauge, a return pipe from the gauge adapted to form a connection with said conduit, and a liquid trap in said return pipe.

6. In combination with a conduit, a gauge to measure the pressure of a gaseous stream flowing through the conduit, piping adapted to form a connection from said conduit to the gauge, said piping being restricted at one point, means included in said piping for purifying the gas delivered to the gauge, a return pipe from the gauge adapted to form a connection with said conduit and a liquid trap in said return pipe, said trap having an outlet delivering entrapped liquid to the gauge by gravity.

7. In combination with a conduit, a gauge to measure the pressure of a gaseous stream flowing through the conduit, piping adapted to form a connection from said conduit to the gauge, said piping being restricted at one point, means included in said piping for purifying the gas delivered to the gauge, a return pipe from the gauge adapted to form a connection with said conduit, a liquid trap in said return pipe, said trap having a buoyantly operated valve outlet delivering entrapped fluid to the gauge by gravity.

8. In combination with a conduit, a gauge to measure the pressure of a gaseous stream flowing through the conduit, piping adapted to form a connection from said conduit to the gauge, said piping being restricted at one point, means included in said piping for purifying the gas delivered to the gauge, a return pipe from said gauge adapted for connection to the conduit, said return pipe being restricted at one point, a liquid trap beyond said point, said trap having an outlet including a one-way valve for delivering entrapped fluid to the gauge by gravity.

In testimony whereof I have hereunto affixed my signature.

JOHN A. DODGE.